Figure 1:
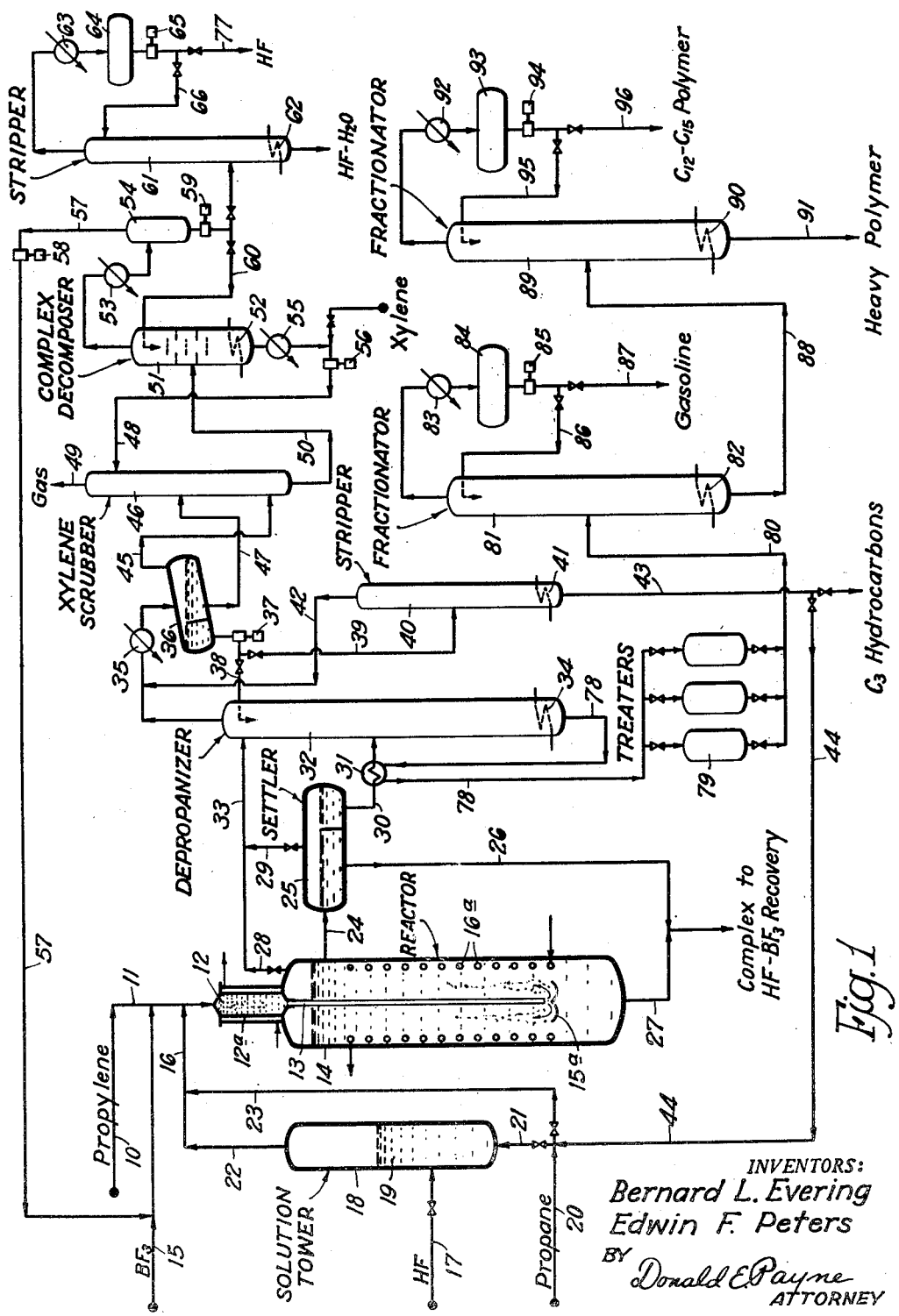

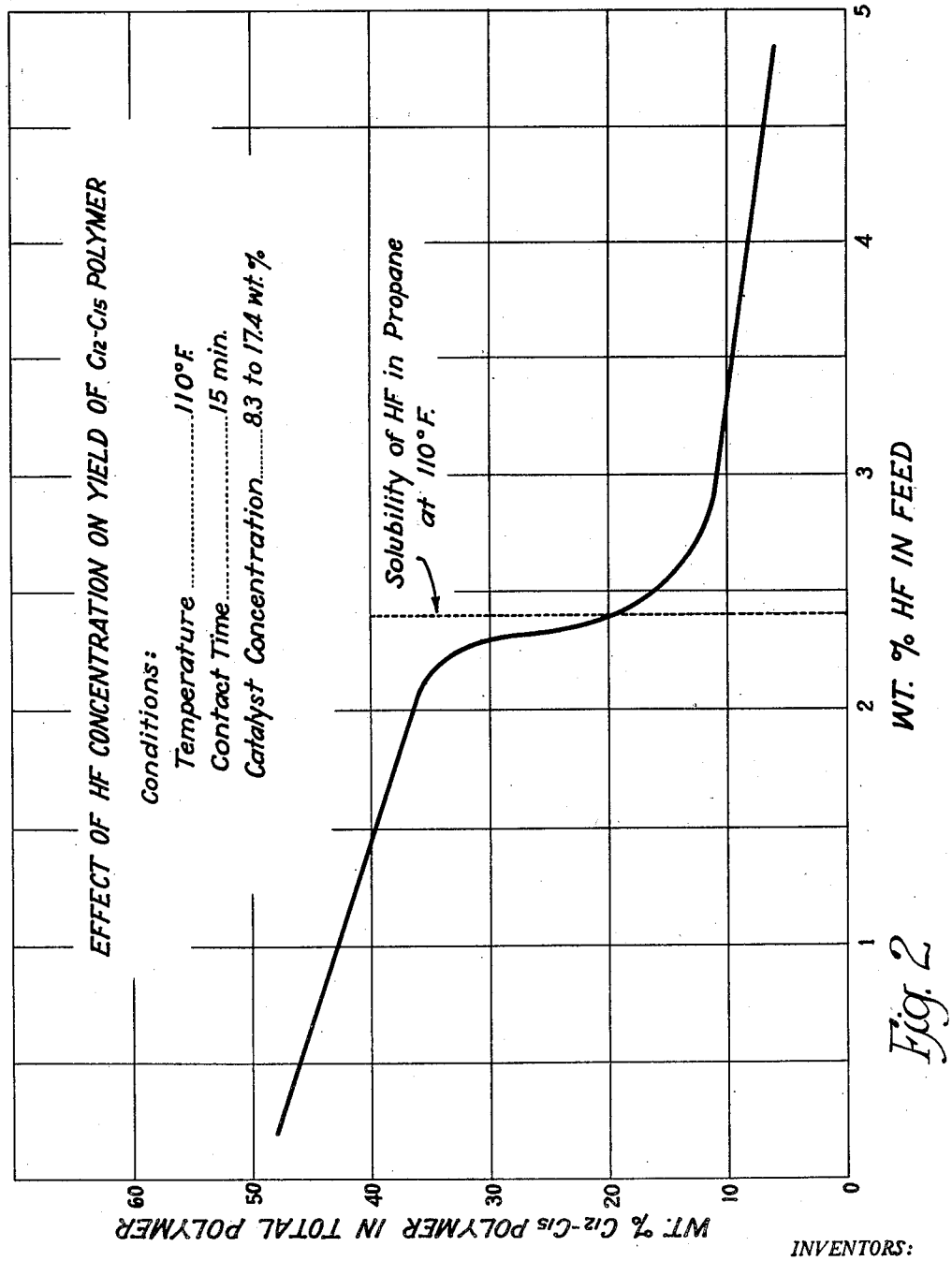

Patented Nov. 7, 1950

2,528,876

UNITED STATES PATENT OFFICE 2,528,876

PROPYLENE POLYMERIZATION WITH HF-BF₃

Bernard L. Evering and Edwin F. Peters, Chicago, Ill., assignors to Standard Oil Company, Chicago, Ill., a corporation of Indiana Application July 3, 1948, Serial No. 37,038

10 Claims. (Cl. 260—683.15)

This invention relates to propylene polymerization with HF-BF₃ catalysts and it pertains more particularly to improved methods and means for directing said polymerization toward the formation of tetramers and pentamers, i. e. olefin polymers containing 12 and 15 carbon atoms per molecule respectively.

It is well known that propylene can be polymerized with a wide variety of catalysts such as aluminum chloride, phosphoric acid, boron fluoride and hydrogen fluoride-boron fluoride mixtures. These known processes, however, have been directed toward the production of gasoline-boiling range polymers or more or less viscous oils of high molecular weight. An object of this invention is to provide a method and means for directing HF-BF₃ polymerization of propylene toward the production of $C_{12}$ and $C_{15}$ polymers which are suitable for the manufacture of detergents, such polymers being commonly referred to as "detergent polymers" because of their intended use in the preparation of detergents. Small amounts of such polymers are formed in various known processes but such amounts are usually too small to warrant the use of such processes for detergent polymer manufacture and furthermore such processes frequently are accompanied by side reactions such as hydrogen transfer which renders the polymers unsuitable for detergent manufacture. For example, when propylene is polymerized with AlCl₃ only about 6% of the total product is in detergent polymer range and the proportion which is within the desired range is more saturated than desirable for use in detergent manufacture. An object of the invention is to provide a process which will produce a polymer containing at least about 40% of unsaturated hydrocarbons in the $C_{12}$–$C_{15}$ range.

Hofmann and Otto (U. S. 1,885,060) showed that propylene could be polymerized with BF₃ to yield more or less viscous oils and numerous investigators since that time have explored the field of olefin polymerization by means of such catalysts. None of these investigators, however, have shown how the polymerization reaction can be controlled to give $C_{12}$–$C_{15}$ polymers as the predominant product. An object of this invention is to provide an improved method and means for effecting HF-BF₃ polymerization of propylene whereby the amount of detergent polymer exceeds not only the amount of gasoline-boiling range polymers but also exceeds the amount of higher boiling viscous polymers and wherein the detergent polymer thus formed is not appreciably saturated by hydrogen transfer during the catalyst polymerization reaction. A further object is to avoid the necessity of recycling C₆ or C₉ polymers as is usually necessary when phosphoric acid is employed as a polymerization catalyst. Other objects will be apparent as the detailed description of the invention proceeds.

We have discovered that the objects of our invention can be accomplished by effecting the polymerization of propylene in the presence of a diluent such as propane under a pressure sufficient to maintain liquid phase polymerization conditions, e. g. of the order of about 300 to 600 p. s. i. g. and at ordinary temperatures within the range of about 40 to 120° F. provided that a single homogeneous liquid phase is maintained in the polymerization zone. The reaction pressure should be sufficient to maintain both the HF component of the catalyst and the reactant and diluent in liquid phase condition and the amount of HF employed should be sufficiently small so that it is completely soluble in the propylene-plus diluent (and reaction product). The solubility of HF in propane under a pressure of about 400 p. s. i. and a temperature of about 110° F. is about 2.4 weight percent. We have discovered when this amount of HF is exceeded, the polymerization reaction is directed toward production of high molecular weight polymers but that on the contrary when the amount of HF is appreciably below the solubility limit, a remarkably large amount of detergent polymer is produced, the amount being greater than either the amount of gasoline-boiling range polymer or the amount of high molecular weight polymer. We prefer to effect the polymerization continuously and to regulate or control the amount of introduced HF to insure a homogeneous HF-hydrocarbon liquid phase in the conversion zone.

The most active catalyst is one containing HF and BF₃ in approximately equal molar proportions. Although in many processes catalyst composition has a marked effect on product distribution, we have found that in our process the mol percent of HF and BF₃ in the catalyst may be varied throughout an enormously wide range without appreciably affecting the nature of the product formed provided that the HF component is well below the solubility limit in the hydrocarbon components. The time required for effecting polymerization is preferably of the order of about 5 to 15 minutes although shorter or longer times may be employed without materially affecting product distribution. The diluent is preferably propane although other inert hydrocarbon diluents may be employed and the amount of diluent is preferably in the range of about 1:5 to 5:1. By dissolving the HF component of the catalyst in the hydrocarbon diluent, such as propane, and introducing it into the polymerization system as a solution, we can insure the necessary homogeneous liquid phase condition and the production of at least about 40% to 50% detergent polymer in the total conversion product, the extent of conversion usually ranging from about 50% to 100%.

In most olefin polymerization processes it is an accepted rule that lowering polymerization temperature results in increasing the molecular weight of the polymer product. In our process we have found that increasing the polymerization temperature to as high as 180° F. has an effect which is directly opposite to the expected effect. At room temperature we obtain a detergent polymer yield of about 40% to 50% or more and a high molecular weight polymer ($C_{24}+$) yield of only about 10 to 20% while at 180° F. our detergent polymer yield is only about 18% and the high molecular weight polymer yield is 50%.

The invention will be more clearly understood from the following detailed description and the cited examples read in conjunction with the accompanying drawings which form a part of the specification and in which Figure 1 is a schematic flow sheet diagrammatically illustrating a continuous polymerization unit for carrying out our process, and Figure 2 is a graph illustrating the remarkable effect of liquid phase HF-hydrocarbon homogeniety on product distribution.

Referring first to Figure 1, propylene is introduced through lines 10 and 11 to mixer 12, which is surrounded by cooling jacket 12a, and thence through reactor tube 13 to the lower part of reaction chamber 14, the propylene being admixed in mixer 12 with $BF_3$ introduced through line 15 and HF (preferably in the form of a propane-HF solution) introduced through line 16. Preferably make-up and recovered HF is initially introduced by line 17 to vessel 18 in amounts sufficient to maintain a substantial column of liquid HF in vessel 19. Propane or other inert hydrocarbon diluent is introduced by line 20 and at least a portion of the introduced propane passes in liquid phase through line 21 upwardly through the column of HF and thence through line 22 to line 16. The amount of HF introduced can be controlled by by-passing a part of the introduced diluent through line 23.

In this particular example about 2 volumes of propane are employed per 3 volumes of propylene in the total charge; while it is preferred to introduce at least a part of the propane through lines 20, 21 and column 19 in order to solve the metering and control problem, the propane may be introduced in admixture with propylene through line 10 and the make-up and recovered HF may be introduced in regulated amounts directly through line 16. The total catalyst in this particular example may contain about 40 to 50 mol percent HF and 60 to 50 mol percent $BF_3$. Such total catalyst may be employed in amounts of about 3 to 4 mol percent based on propylene charged or about 2 to 3% based on total hydrocarbon charged, the total weight percent of HF in the charge thus being about 0.5%. In order to remove impurities from the propane and propylene such hydrocarbons may be given an initial caustic wash in which case they should be water washed and thoroughly dried with calcium chloride or other known drying agents before being introduced into the system.

The homogeneous propane-proylene-HF mixture is intimately mixed with the $BF_3$ in mixer 12 which may be of any known type and the intimate mixture is then rapidly introduced through reaction tube 13 to the base of reaction chamber 14 where the introduced reactants and catalyst may be distributed by baffle 15a or other known distributing means. The reaction chamber should be provided with cooling surfaces which are diagrammatically illustrated as coils 16a. The cooling may be effected by circulating the cooling water around reaction tubes which are secured at each end to headers and other known types of heat exchange may be employed. The temperature of the reactor should preferably be of the order of about 70 to 110° F. although reactor effluent may reach temperatures as high as 130 to 140° F. The contact time in the reaction tube or tubes is preferably about 5 to 50 seconds, e. g. about 30 seconds and in the total reactor may be as great as about 5 to 15 minutes. The reaction pressure should be sufficient to maintain both the HF and the hydrocarbon charge in liquid phase condition such a pressure being in this case of the order of about 400 p. s. i. g.

Reactor effluent passes by line 24 to settler 25 wherein any small amount of complex which may be formed can settle out and be withdrawn to line 26. Similarly, any complex that might otherwise tend to accumulate in reactor 14 is withdrawn by line 27; it is highly desirable that any such complex be removed as rapidly as it accumulates because such complex tends to act as a separate liquid phase which, in the presence of HF, tends to direct conversion toward high molecular weight polymers instead of the $C_{12}$-$C_{15}$ polymers. The withdrawn complex may be treated in known manners for recovery of HF and $BF_3$ and/or it may be hydrolized for production of drying oils or other types of by-products. It should be emphasized however that under the preferred conditions of operation less than 1% of the charge is converted into complex.

If $BF_3$ or other gas tends to accumulate in the upper part of the reactor 14 or settler 25, such gas may be withdrawn through lines 28 and 29. The reactor should be carefully designed to attain intimate mixing and uniform distribution of the $BF_3$ and it is important that $BF_3$ (or other gas) should not accumulate in the system.

The product stream from settler 25 is withdrawn through line 30 and heat exchanger 31 wherein it is heated to a temperature of about 250° F. before it is introduced into depropanizer tower 32. Any gases vented through lines 28 and 29 may likewise be introduced into tower 32 through line 33. Tower 32 may be operated at a pressure of about 260 p. s. i. g. with a top temperature of about 140° F. and a bottom temperature of about 480° F. the latter being obtained by use of suitable reboiler or heating means 34. The overhead products are cooled in condenser 35 and introduced into separator 36 wherein both HF and gas are removed from hydrocarbon liquid. The hydrocarbon liquid condensate is removed from the separator by pump 37 a part of the condensate being returned by line 38 to serve as reflux in tower 32 while the remainder is introduced by line 39 to stripping tower 40 provided with a heater 41 at its base for maintaining a bottom temperature at about 140° F. Propane-HF-azeotrope from the top of the stripper is returned from line 42 to the stream entering cooler 35 and settler 36. The HF-free propane is removed from the base of the stripper through line 43 and a part of this propane, if it contains no substantial amounts of propylene, may be recycled by line 44 to serve as diluent thus eliminating the necessity of introducing propane via line 20. Since only a small amount of $BF_3$ is present in the stream in line 39, the recycle stream for line 44 may come directly from line 39 and thus decrease the load on stripper 40.

The $BF_3$ containing gases from separator 36 are introduced by line 45 to the lower part of tower 46 and settled HF is introduced from the bottom of separator 36 by line 47 to an intermediate point in the packed tower. Xylene at about 130° F. is introduced by line 48 at the upper part of packing tower 46 for combining with the $BF_3$ in the form of a complex, thus eliminating $BF_3$ from residual gases which are vented through line 49 which preferably discharges into a caustic scrubber. Xylene-$BF_3$ complex and HF are withdrawn from tower 46 by line 50 and introduced into baffled tower 51 which may operate at about 35 p. s. i. g. and at a temperature of about 300° F. which is maintained by steam coil 52. HF and released $BF_3$ pass overhead through cooler 53 to condensate receiver-separator 54. Xylene leaves the base of baffle tower 51 and after being cooled in cooler 55 to a temperature of about 130° F. it is reintroduced by pump 56 at the upper part of tower 46.

The $BF_3$ which is separated in receiver-separator 54 is returned by line 57 and compressor 58 to the reactor. Condensate from receiver-separator 54 is withdrawn by pump 59 and a part of it is returned by line 60 to serve as reflux in baffle tower 51 while another part is introduced into tower 61 which is operated at about 70 p. s. i. g. with a bottom temperature of about 230° F. which is maintained by heater 62. Substantially anhydrous HF is taken overhead through condenser 63 to receiver 64. A part of the condensate removed by pump 65 is returned by line 66 as reflux while the remainder is withdrawn through line 77 for recycle to the system, preferably to vessel 18.

The depropanized polymer from the base of depropanizer 32 passes by line 78 through heat exchanger 31 and thence through one or more bauxite treaters 79 and line 80 to gasoline fractionating tower 81 which may operate at about 20 p. s. i. g. with a bottom temperature of about 500° F. maintained by heater 82. The overhead gasoline fraction is condensed in cooler 83 and collected in receiver 84 from which a part of it is returned by pump 85 and line 86 to serve as reflux while the net gasoline fraction is withdrawn through line 87. A system designed to charge about 1500 barrels per day of propane-propylene charging stock as hereinabove described may yield about 150 to 200 barrels per day of gasoline-boiling range polymers.

The polymer fractions higher boiling than gasoline are introduced by line 88 to fractionating tower 89 which is preferably operated at about 350 mm. mercury absolute pressure with a top temperature of about 365° F. and a bottom temperature of about 550° F. maintained by heater 90. $C_{18}$ and heavier polymers are withdrawn from the base of tower 89 through line 91. The overhead from tower 89 is condensed in cooler 92 and collected in receiver 93. A part of this condensate is returned by pump 94 and line 95 for reflux in tower 89 and the net production of $C_{12}$–$C_{15}$ polymer is withdrawn through line 96. In this particular case upwards of 300 barrels per day of $C_{12}$–$C_{15}$ polymer can thus be produced which polymer has not been saturated by hydrogen transfer. The polymer thus produced is particularly suitable for the manufacture of detergents. The heavier viscous polymer withdrawn through line 91 may amount to less than 150 barrels per stream day.

The $C_{12}$–$C_{15}$ polymer fractionation differs from propylene polymer produced by $AlCl_3$ polymerization not only because it is less saturated on account of hydrogen transfer but also because it consists essentially of monomer multiples, i. e. $C_{12}$ and $C_{15}$ hydrocarbons with very little $C_{13}$ and $C_{14}$ hydrocarbon material. In phosphoric acid polymerization or propylene the desired amounts of $C_{15}$ polymer are formed by recycling $C_6$ and $C_9$ polymers but in our process such recycling is unnecessary and is in fact of little or no value.

While a commercial scale example of our process has been described it should be understood that the invention is not limited to the specific proportions, operating conditions, etc, therein set forth. For a more complete understanding of the invention reference will be made to typical data obtained in a small scale continuous reactor with various amounts of diluent, catalyst compositions, catalyst concentrations, contact times, etc. The small scale reactors were 28 inches long and 3/8 inch, 1 inch and 1½ inches in internal diameter providing total reactor volumes of 61, 275 and 680 ml., most of the work having been done in the largest reactor. A 1/8-inch tubular reaction pipe approximately 25 inches long (corresponding to element 13 in reactor 14) introduced the reacting mixtures at the base of the reactor and the reaction took place with the reactor surounded by a water packet for maintaining substantially constant polymerization temperature. Difficulty was encountered in metering HF directly into the reaction mixture and best results were obtained when the HF was introduced as a propane solution. The reactor effluent was introduced into a polymer receiver which discharged gasiform materials to a soda lime tube for acid vapor recovery and a solid carbon dioxide condenser to recover the propane diluent and unconverted propylene. Representative reaction conditions and results are illustrated in the following table.

| Run | A | B | C | D | E | F | G | H | I | J |
|---|---|---|---|---|---|---|---|---|---|---|
| Hydrocarbons: | | | | | | | | | | |
| Propylene grams | 302 | 1,035 | 1,635 | 705 | 845 | 597 | 636 | 537 | 992 | 865 |
| Propane grams | 101 | 270 | 756 | 177 | 2,295 | 150 | 160 | 144 | 2,670 | 2,340 |
| Catalyst: | | | | | | | | | | |
| $BF_3$, grams | 125 | 21.8 | 66.0 | 45.5 | 14.3 | 52.4 | 90.5 | 107.5 | 23.8 | 21.8 |
| $HF_3$, grams | Trace | 1.4 | 4.8 | 3.4 | 38.6 | 15.4 | 26.6 | 31.0 | 17.4 | 16.0 |
| Weight per cent HF-$BF_3$(based on charge) | 23.7 | 1.8 | 2.9 | 5.2 | 1.7 | 8.3 | 12.8 | 16.8 | 1.1 | 1.2 |
| Mol. per cent HF in HF-$BF_3$ | <.1 | 18 | 20 | 20 | 90 | 50 | 50 | 50 | 71 | 71 |
| Weight per cent HF as charge | <.1 | 0.11 | 0.20 | 0.39 | 1.23 | 2.06 | 3.34 | 4.55 | 0.47 | 0.50 |
| Experimental Cond.: | | | | | | | | | | |
| Temp. °F | 110 | 110 | 110 | 110 | 110 | 110 | 110 | 110 | 180 | 45 |
| Pres., p. s. i. g | 400 | 440 | 440 | 440 | 440 | 440 | 440 | 440 | 600 | 400 |
| Contact time, min | 25 | 15 | 15 | 15 | 7.5 | 15 | 15 | 15 | 11 | 11 |

| Run | A | B | C | D | E | F | G | H | I | J |
|---|---|---|---|---|---|---|---|---|---|---|
| Weight per cent conversion | 92 | 70 | 59 | 39 | 79 | 85 | 92 | 85 | 73 | 49 |
| Polymer Compos.: | | | | | | | | | | |
| $C_6$–$C_9$ | 7 | 18 | 20 | 14 | 26 | 6 | 7 | 6 | 10 | 10 |
| $C_{12}$–$C_{15}$ | 51 | 43 | 52 | 54 | 48 | 38 | 10 | 8 | 18 | 43 |
| $C_{18}$–$C_{21}$ | 23 | 17 | 16 | 18 | 16 | 23 | 12 | 13 | 22 | 26 |
| $C_{21}+$ | 19 | 22 | 12 | 14 | 10 | 33 | 71 | 73 | 50 | 21 |
| Weight Per cent Complex based on propylene chg | 1 | 1 | 1 | 1 | 1 | 3 | 8 | 15 | 1 | 1 |

The data set forth in the above table is typical of a vast amount of data which has been acquired from which many surprising results may be stated. Of extreme importance is the weight percent HF charged to the reactor. Under the conditions employed, i. e. at a temperature of 110° F. and a pressure of 400 p. s. i., the solubility of HF in propane is about 2.4 weight percent. When substantially less than this amount of HF was employed, at about 110° F., about 40 to 60% of $C_{12}$–$C_{15}$ polymer was obtained regardless of the propane-propylene ratio, the mol percent HF in the HF-$BF_3$ and the weight percent of HF-$BF_3$ based on charge (note Runs A to E inclusive). When the amount of HF employed was sufficient to exceed its solubility in the hydrocarbon charge, thereby resulting in the formation of a heterogeneous liquid phase in the polymerization zone, the amount of $C_{12}$–$C_{15}$ polymer suddenly dropped to a remarkable extent and the chief product of the reaction was viscous high molecular weight polymers (note Runs G and H). Even when the weight percent HF was 2.06 (Run F) there apparently was a phase separation in a part or parts of the reactor because the $C_{12}$–$C_{15}$ polymer yield dropped to 38% and there was a marked increase in the viscous polymer yield.

Another striking feature is the fact that when homogeneous phase conditions are employed (i. e. when the weight percent HF was well below 2.4 weight percent) very little complex was formed, the amount in all cases being about 1% or less; however, after the separate liquid HF phase is formed (due to the use of HF in amounts in excess of 2.4 weight percent of charge) there is a sharp increase in complex formation as shown by Runs G and H.

The striking effect of HF concentration on product polymer composition is shown in Figure 2 which graphically illustrates the fact that product distribution may gradually change with the weight percent HF in feed in the region below about 2 weight percent and also in the region above about 3 weight percent but that there is a difference in the type or kind of polymerization which is effected in these two regions. Where the amount of HF is such that a homogeneous liquid phase is assured the products are predominantly $C_{12}$–$C_{15}$ polymers. When the amount of HF is sufficient to produce a heterogeneous phase the products are almost entirely viscous high molecular weight polymers.

The phenomena illustrated in Figure 2 and in the tabulated data explains the difficulties encountered in attempts to produce large yields of $C_{12}$–$C_{15}$ polymer by metering HF directly into the reactor. In such operations, it is difficult to prevent heterogeneous liquid phases at least in the mixing zone and a part of the olefins are thus converted into the undesirable viscous oils of high molecular weight. Solution of HF in introduced propane is a sure safeguard against heterogeneous phase conditions. It should be understood however that the homogeneous phase may be maintained at all times by other operating procedures—for example, a portion of the propylene charging stock may first be reacted with HF to form a propylene fluoride and in the mixer or conversion zone the propylene fluoride may liberate HF so that at no time is the HF in a separate liquid phase. While substances which afford HF may thus be used in place of HF itself, such substances cannot be considered as the equivalent of HF and for best results and smoothest operation we prefer to introduce the HF as such.

The mol percent of the HF in the HF-$BF_3$ is not of great importance. Even a trace of HF is sufficient to accomplish the desired results (note Run A). The most active catalyst is one containing about equal parts of HF and $BF_3$ on a mol basis. From an operating standpoint, it may be desirable to employ about 40 to 50 mol percent of HF in the HF-$BF_3$ mixture because HF can be recovered more easily and completely and because approximately this amount of HF in the catalyst composition is required for maximum propylene cleanup. However, it should be feasible to operate from less than 10% to upwards of 90% of HF in the catalyst composition and throughout this composition range the product distribution is remarkably constant.

The effect of temperature is also surprising in this process. As temperatures are increased from about 40 to 180° F. the yield of $C_{12}$–$C_{15}$ olefins markedly falls off while the yield of viscous polymers of high molecular weight markedly increases, the yield of $C_6$–$C_9$ olefins reaching a maximum and the yield of $C_{18}$–$C_{21}$ olefins reaching a minimum at about 130° F. (with catalyst concentration at 1.1 weight percent, catalyst composition of 71 mol percent HF and contact time 11 minutes). Runs I and J when compared with Runs D and E for example illustrate the effect of temperature and indicate that the temperature should be markedly lower than 180° F. and preferably should be in the range of about 45 to 110° F.

In our process the diluent serves an important function in addition to that which such diluents performed in prior polymerization processes. The diluent dissolves the HF and insures the maintenance of a homogeneous liquid phase during the continuous polymerization reaction. Preferably the diluent also serves as a vehicle for introducing the HF in desired amounts and when the HF is so introduced it cannot possibly form a separate liquid phase in the polymerization zone.

We claim:

1. The method of producing $C_{12}$–$C_{15}$ polymers by the polymerization of propylene with an HF-$BF_3$ catalyst which method comprises contacting said propylene and said catalyst at a temperature in the range of about 40 to 140° F. under a pressure sufficient to maintain both the propylene and HF in liquid phase condition and employing a sufficiently large amount of an inert diluent in which HF is soluble to an appreciable extent and a sufficiently small amount of HF in the catalyst composition so that the HF will be completely dissolved in the diluent-propylene mixture during the polymerization.

2. The method of producing large yields of tetramer and pentamer in the polymerization of propylene with an HF-BF₃ catalyst which method comprises effecting said polymerization in the presence of an inert diluent in which HF is soluble to a certain extent, effecting the polymerization at a temperature higher than about 40° F. but lower than about 140° F. under a pressure sufficient to maintain the propylene and HF in liquid phase and limiting the amount of HF to a value substantially below its solubility under the polymerization conditions whereby the polymerization is effected with all liquid components in homogeneous phase condition.

3. The method of polymerizing propylene with an HF-BF₃ catalyst to obtain low molecular weight polymer rather than viscous high molecular weight oils as the preponderant product, which method comprises dissolving the HF component of the catalyst in an inert diluent, intimately admixing the resulting solution with propylene and the BF₃ component of the catalyst and contacting said mixture in the polymerization zone maintained at a temperature in the range of about 40 to 140° F. and a pressure in the range of about 300 to 500 pounds per square inch 4. In the method of effecting a hydrocarbon conversion with an HF-BF₃ catalyst under conditions wherein both hydrocarbon and HF are in liquid phase, the improvement which comprises dissolving the HF component of the HF-BF₃ in an inert diluent at a temperature which is not substantially higher than conversion temperature and contacting the hydrocarbon and BF₃ component with said solution under homogeneous liquid phase conversion conditions.

5. The method of effecting hydrocarbon conversion with an HF-BF₃ catalyst which method comprises passing an inert diluent having a solvent power for HF through a column of HF to produce a diluent-HF solution, intimately admixing said solution with BF₃ and the hydrocarbon to be converted and effecting conversion under sufficient pressure to maintain both the hydrocarbon diluent and the HF in homogeneous liquid phase condition.

6. The method of polymerizing propylene with an HF-BF₃ catalyst which comprises dissolving the HF catalyst component in propane, admixing the resulting solution with propylene and the BF₃ component of the catalyst, passing said mixture through a polymerization zone at a temperature in the range of about 40 to 140° F. at a pressure in the range of about 300 to about 500 p. s. i. and with a residence time in the polymerization zone less than 15 minutes.

7. The method of claim 6 which includes the further steps of removing from the polymerization mixture any complex which may be formed in order to substantially avoid the presence of any substantial amount of complex in the polymerization zone.

8. A continuous process for producing olefinic hydrocarbons containing about 12 to 15 carbon atoms per molecule which process comprises intimately mixing propylene, propane, HF and BF₃ and passing said mixture through a polymerization zone, maintaining said zone at a temperature in the range of about 40 to about 140° F. and at a pressure in the range of about 300 to about 500 p. s. i. sufficient to maintain both the propylene and HF in liquid phase, employing a sufficiently large amount of propane and a sufficiently small amount of HF so that said liquid phase will be homogeneous, discharging polymerization zone effluent to a settling zone, removing complex material from said effluent in said settling zone, passing the remaining effluent to a depropanizer zone, separating propane and lower boiling components from higher boiling components in the depropanizing zone, separating the overhead from the propanizing zone into a propane fraction, a gas fraction, a BF₃ fraction and an HF fraction, returning the BF₃ and HF fractions to the polymerization zone and fractionating the depropanized components into a gasoline boiling range fraction, a fraction consisting of C₁₂–C₁₅ hydrocarbons and at least one heavy polymer fraction.

9. The method of claim 8 which includes the step of purging gases from the reaction mixture before said mixture is introduced into the depropanizing zone and introducing said gases into said depropanizing zone.

10. The method of claim 8 which includes the step of dissolving HF in propane prior to said mixing step.

BERNARD L. EVERING.
EDWIN F. PETERS.

REFERENCES CITED

The following references are of record in the file of this patent:

UNITED STATES PATENTS

| Number | Name | Date |
| --- | --- | --- |
| 2,318,719 | Schneider | May 11, 1943 |
| 2,401,933 | Hersberger | June 11, 1946 |
| 2,416,106 | Linn et al. | Feb. 18, 1947 |
| 2,431,454 | Berk | Nov. 25, 1947 |
| 2,436,929 | Linn | Mar. 2, 1948 |